United States Patent
Sharma et al.

(10) Patent No.: US 12,156,019 B2
(45) Date of Patent: Nov. 26, 2024

(54) METHOD AND SYSTEM FOR PROVIDING COMMUNICATION SERVICE IN USER EQUIPMENT USING DATA NETWORK

(71) Applicant: Samsung Electronics Co., Ltd., Suwon-si (KR)

(72) Inventors: Ankit Sharma, Noida (IN); Gurmanjeet Singh Sidhu, Noida (IN); Manish Kumar Prajapati, Noida (IN); Himanshu Sharma, Noida (IN); Sanat Sharma, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 312 days.

(21) Appl. No.: 17/711,700

(22) Filed: Apr. 1, 2022

(65) Prior Publication Data

US 2022/0330119 A1    Oct. 13, 2022

Related U.S. Application Data

(63) Continuation of application No. PCT/KR2022/004576, filed on Mar. 31, 2022.

(30) Foreign Application Priority Data

Apr. 4, 2021   (IN) .............................. 202141015874

(51) Int. Cl.
*H04W 36/14*    (2009.01)
*H04L 65/1016*    (2022.01)
(Continued)

(52) U.S. Cl.
CPC .......... *H04W 36/14* (2013.01); *H04L 65/1016* (2013.01); *H04W 8/183* (2013.01); *H04W 36/302* (2023.05); *H04W 88/06* (2013.01)

(58) Field of Classification Search
CPC ..... H04W 36/14; H04W 8/183; H04W 36/30; H04W 88/06; H04W 12/03; H04W 76/18;
(Continued)

(56) References Cited

U.S. PATENT DOCUMENTS 8,750,931 B2    6/2014  Park et al.
2015/0092611 A1  4/2015  Ponukumati et al.
(Continued)

FOREIGN PATENT DOCUMENTS

CN    111479262 A    7/2020
EP    4 138 433 A1   2/2023
(Continued)

OTHER PUBLICATIONS

3rd Generation Partnership Project; Technical Specification Group Services and System Aspects; Network architecture (Release 17), 3GPP TS 23.002 V17.0.0, Mar. 30, 2021, Sophia Antipolis, France.
(Continued)

*Primary Examiner* — Huy C Ho
(74) *Attorney, Agent, or Firm* — Jefferson IP Law, LLP

(57) ABSTRACT

A method of providing network service to a user equipment (UE) may be provided. The method may include identifying an event associated with a first subscriber identity module (SIM) from a plurality of SIMs, wherein the event includes at least one of: non-availability of a network service over the first SIM, a condition that a critical data session is on-going for at least one application associated with at least one SIM from the plurality of SIMs in the UE, and a condition that a power saving criterion is met. Further, creating an enhanced packet data gateway (ePDG) interface for the first SIM using a physical interface as mobile network of a second SIM from the plurality of SIMs, and providing the network service associated with the first SIM using the ePDG interface.

20 Claims, 11 Drawing Sheets

(51) Int. Cl.
*H04W 8/18* (2009.01)
*H04W 36/30* (2009.01)
*H04W 88/06* (2009.01)

(58) Field of Classification Search
CPC ..... H04W 84/12; H04W 12/45; H04W 48/18; H04W 52/0245; H04W 52/0254; H04W 52/0258; H04L 65/1016; H04L 63/045; H04L 65/1023; H04L 65/1073; H04L 65/65; H04L 65/80; Y02D 30/70
USPC .......................................... 455/436
See application file for complete search history.

(56) References Cited

U.S. PATENT DOCUMENTS

| | | |
|---|---|---|
| 2016/0262200 A1 | 9/2016 | Su |
| 2016/0353449 A1 | 12/2016 | Chuttani et al. |
| 2017/0118255 A1* | 4/2017 | Tsai .................... H04L 63/0272 |
| 2018/0270649 A1 | 9/2018 | Tsai et al. |
| 2019/0373447 A1* | 12/2019 | Chughtai .......... H04M 15/8083 |
| 2020/0037281 A1 | 1/2020 | Lee et al. |
| 2020/0267619 A1 | 8/2020 | Huang et al. |
| 2020/0296638 A1 | 9/2020 | Tsai et al. |
| 2020/0383152 A1 | 12/2020 | Walia et al. |

FOREIGN PATENT DOCUMENTS

| | | |
|---|---|---|
| JP | 2020-102781 A | 7/2020 |
| WO | 2020/222531 A1 | 11/2020 |

OTHER PUBLICATIONS

International Search Report dated Jun. 22, 2022, issued in International Application No. PCT/KR2022/004576.
Indian Office Action dated Nov. 14, 2022, issued in Indian Patent Application No. 202141015874.
Extended European Search Report dated Apr. 23, 2024, issued in European Patent Application No. 22784854.6.

* cited by examiner

METHOD AND SYSTEM FOR PROVIDING COMMUNICATION SERVICE IN USER EQUIPMENT USING DATA NETWORK

CROSS-REFERENCE TO RELATED APPLICATION(S)

This application is a continuation application, claiming priority under § 365(c), of an International application No. PCT/KR2022/004576, filed on Mar. 31, 2022, which is based on and claims the benefit of an Indian patent application number 202141015874, filed on Apr. 4, 2021, in the Indian Intellectual Property Office, the disclosure of which is incorporated by reference herein in its entirety.

FIELD OF INVENTION

The disclosure relates to field of wireless communication technology. More particularly, the disclosure relates to a method and system of providing a network service to a user equipment (UE) comprising a plurality of subscriber identity modules (SIMs).

BACKGROUND

In recent times, with the advent of the smart phone based user equipment (UE), the usage of the wireless communication systems are rapidly growing. Further, the wireless communication technology has evolved from voice-only communications to include data communication, such as Internet, short message service, and multimedia content. Further, the cellular telephone communications, such as voice calls from the UE, routinely fail because the UE enters a location-specific network coverage (i.e., "dead zone") or high network congestion and the like. Dropping a call, especially an emergency call, can cause inconvenience to the users involved in a phone call. Failure of a data communication session may be costly and inconvenient for the users of the UE.

To circumvent the problems of poor/no network coverage, the existing UEs enables the usage of multiple subscriber identity module (SIM) in the UE. When a poor network coverage is experienced using a first SIM associated with the first operator, the user may communicate using a second SIM associated with the second operator.

Further, the UEs can use the service of voice over Wi-Fi technology to continue an on-going communication when the first SIM experiences a poor or no network coverage.

However, in the existing solutions the switching of the communication service from the first SIM to the second SIM is a manual operation and dis-continues an on-going connection and the network service cannot be provided on both SIMs. Therefore, a re-establishment of the connection is required. Further, the voice over Wi-Fi technology requires a Wi-Fi connection that may be available to the UE at all the instants of time.

In view of the above mentioned disadvantages, there is a need to provide a communication service to the UE without dis-continuing an on-going communication when there is poor/no network coverage.

Thus, it is desired to address the above mentioned disadvantages or other shortcomings or at least provide a useful alternative.

The above information is presented as background information only to assist with an understanding of the disclosure. No determination has been made, and no assertion is made, as to whether any of the above might be applicable as prior art with regard to the disclosure.

OBJECT OF INVENTION

Aspects of the disclosure are to address at least the above-mentioned problems and/or disadvantages and to provide at least the advantages described below. Accordingly, an aspect of the disclosure is to provide a method and system to provide a network service to a user equipment (UE) comprising a plurality of subscriber identity modules (SIMs).

Another aspect of the disclosure is to provide the network service associated with a SIM having no network coverage or poor network coverage.

Additional aspects will be set forth in part in the description which follows and, in part, will be apparent from the description, or may be learned by practice of the presented embodiments.

SUMMARY

In accordance with an aspect of the disclosure, a method of providing a network service to a user equipment (UE) comprising a plurality of subscriber identity modules (SIMs) is provided. The method includes detecting, by the UE, an event associated with a first SIM from the plurality of SIMS, wherein the event comprises at least one of: non-availability of the network service over the first SIM, a critical data session is on-going for at least one application associated with at least one SIM from the plurality of SIMs in the UE, and a power saving criteria is met in the UE. Further, the method comprises creating, by the UE, an enhanced packet data gateway (ePDG) interface for the first SIM using a physical interface as mobile network of a second SIM from the plurality of SIMS. Finally, the method comprises providing, by the UE, the network service associated with the first SIM using the ePDG interface.

In an embodiment of the disclosure, detecting, by the UE, the non-availability of the network service over the first SIM comprises obtaining at least one network availability parameter associated with the first SIM, wherein the at least one network availability parameter comprises at least one of a reference signal received power (RSRP) value, a reference signal received quality (RSRQ) value, a block error rate (BLER) value, a signal to noise ratio (SNR) value, or a real-time transport protocol (RTP) packet loss value based on a received signal associated with the first SIM. Further, determining whether the at least one network availability parameter meets a network availability criteria. Furthermore, detecting the non-availability of the network service over the first SIM in response to determining that the at least one network availability parameter meets a network availability criteria.

In an embodiment of the disclosure, the network availability criteria is dynamically defined based on at least one of a location of the UE, an availability of at least one application in the UE, a signal strength level defined configuration.

In an embodiment of the disclosure, detecting, by the UE, the critical data session is on-going for at least one application associate with the second SIM comprises identifying the at least one application having an on-going data session associated with the second SIM. Further, determining whether the at least one application meets a critical application criteria. Furthermore, detecting that the on-going data session for the at least one application as the critical data session in response to determining that the at least one application meets the critical application criteria.

In an embodiment of the disclosure, the critical application criteria is dynamically defined based on at least one of a critical application database, a categorization of an activity as critical by a protocol stack of the UE, an preference setting of at least one application in the UE.

In an embodiment of the disclosure, detecting, by the UE, the power saving criteria is met in the UE comprises determining a current state of the UE, wherein the current state of the UE indicates at least one of a current state of charge (SOC) of a battery of the UE, a number of applications running the UE, a type of application running in the UE, and a location of the UE. Further, determining whether the current state of the UE meets the power saving criteria. Furthermore, detecting the power saving criteria is met in the UE in response to determining that the current state of the UE meets the power saving criteria.

In an embodiment of the disclosure, the power saving criteria is dynamically defined based on at least one of a location of the UE, a usage pattern of at least one application of the UE, and a usage pattern of the battery of the UE.

In an embodiment of the disclosure, creating the ePDG interface for the first SIM using the data network of the second SIM comprises performing a handshake operation by sending a request to an Internet protocol multimedia subsystem (IMS) server associated with a network provider of the first SIM to process the network service for the first SIM via the mobile data of the second SIM as a single call using a subscriber information present in universal SIM (USIM) or Internet protocol multimedia services identity module (ISIM) application of the first SIM. Further, receiving a response from the IMS server to process the network service associated with the first SIM via the mobile data of the second SIM.

In an embodiment of the disclosure, providing the network service associated with the first SIM using the ePDG interface comprises creating a data packet by encapsulating a payload associated with the network service and an Internet protocol (IP) header associated with the first SIM, wherein the encapsulating the data packet is performed using the IP header associated with the second SIM. Further, sending the data packet to at least one network component comprising at least one of an IMS server, an extensible markup language (XML) configuration access protocol (XCAP) server, and a multimedia messaging service (MMS) server, associated with the first SIM.

In an embodiment of the disclosure, providing the network service associated with the first SIM to the user using the ePDG interface comprises receiving a data packet comprising a payload and a IP header associated with the first SIM encapsulated using a IP header associated with the second SIM from an IMS server corresponding to the first SIM. Further, providing the payload and the IP header associated with the first SIM to the user, wherein the user payload comprises the network service.

In an embodiment of the disclosure, the method comprises configuring a protocol stack of the UE to stop a Radio Frequency Polling for the first SIM and use the mobile data of the second SIM as the physical interface to provide the network service for the first SIM.

In accordance with another aspect of the disclosure, a UE is provided. The UE includes a plurality of SIMs for providing a network service, the UE includes a memory, a processor, and an ePDG controller communicatively coupled to the memory and the processor. The ePDG controller is configured to detect an event associated with a first SIM from the plurality of SIMS, wherein the event comprises at least one of: non-availability of the network service over the first SIM, a critical data session is on-going for at least one application associated with at least one SIM from the plurality of SIMs in the UE, and a power saving criteria is met in the UE. Further, the ePDG controller is configured to create an ePDG interface for the first SIM using a physical interface as mobile network of a second SIM from the plurality of SIMS. Furthermore, the ePDG controller is configured to provide the network service associated with the first SIM using the ePDG interface.

In an embodiment of the disclosure, the ePDG controller is configured to detect the non-availability of the network service over the first SIM comprises obtaining at least one network availability parameter associated with the first SIM, wherein the at least one network availability parameter comprises at least one of a RSRP value, a RSRQ value, a BLER value, a SNR value, and a RTP packet loss value based on a received signal associated with the first SIM. Further, determining whether the at least one network availability parameter meets a network availability criteria. Furthermore, detecting the non-availability of the network service over the first SIM in response to determining that the at least one network availability parameter meets a network availability criteria.

In an embodiment of the disclosure, the ePDG controller is configured to detect the critical data session is on-going for at least one application associate with the second SIM comprises identifying the at least one application having an on-going data session associated with the second SIM. Further, determining whether the at least one application meets a critical application criteria. Furthermore, detecting that the on-going data session for the at least one application as the critical data session in response to determining that the at least one application meets the critical application criteria.

In an embodiment of the disclosure, the ePDG controller is configured to detect the power saving criteria is met in the UE comprises determining a current state of the UE, wherein the current state of the UE indicates at least one of a current state of charge (SOC) of a battery of the UE, a number of applications running the UE, a type of application running in the UE, and a location of the UE. Further, determining whether the current state of the UE meets the power saving criteria. Furthermore, detecting the power saving criteria is met in the UE in response to determining that the current state of the UE meets the power saving criteria.

In an embodiment of the disclosure, the ePDG controller is configured to create for the first SIM using the data network of the second SIM comprises performing a handshake operation by sending a request to an IMS server associated with a network provider of the first SIM to process the network service for the first SIM via the mobile data of the second SIM as a single call using a subscriber information present in USIM or ISIM application of the first SIM. Further, receiving a response from the IMS server to process the network service associated with the first SIM via the mobile data of the second SIM.

In an embodiment of the disclosure, the ePDG controller is configured to provide the network service associated with the first SIM using the ePDG interface comprises creating a data packet by encapsulating a payload associated with the network service and an Internet Protocol (IP) header associated with the first SIM, wherein the encapsulating the data packet is performed using the IP header associated with the second SIM. Further, sending the data packet to at least one network component comprising at least one of an IMS server, an XML XCAP server, and a MMS server, associated with the first SIM.

In an embodiment of the disclosure, the ePDG controller is configured to provide the network service associated with the first SIM to the user using the ePDG interface comprises receiving a data packet comprising a payload and a IP header associated with the first SIM encapsulated using a IP header associated with the second SIM from an IMS server corresponding to the first SIM. Further, providing the payload and the IP header associated with the first SIM to the user, wherein the user payload comprises the network service.

In an embodiment of the disclosure, the ePDG controller configures a protocol stack of the UE to stop a radio frequency polling for the first SIM and use the mobile data of the second SIM as the physical interface to provide the network service for the first SIM.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF FIGURES

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION OF INVENTION

Figure 1:
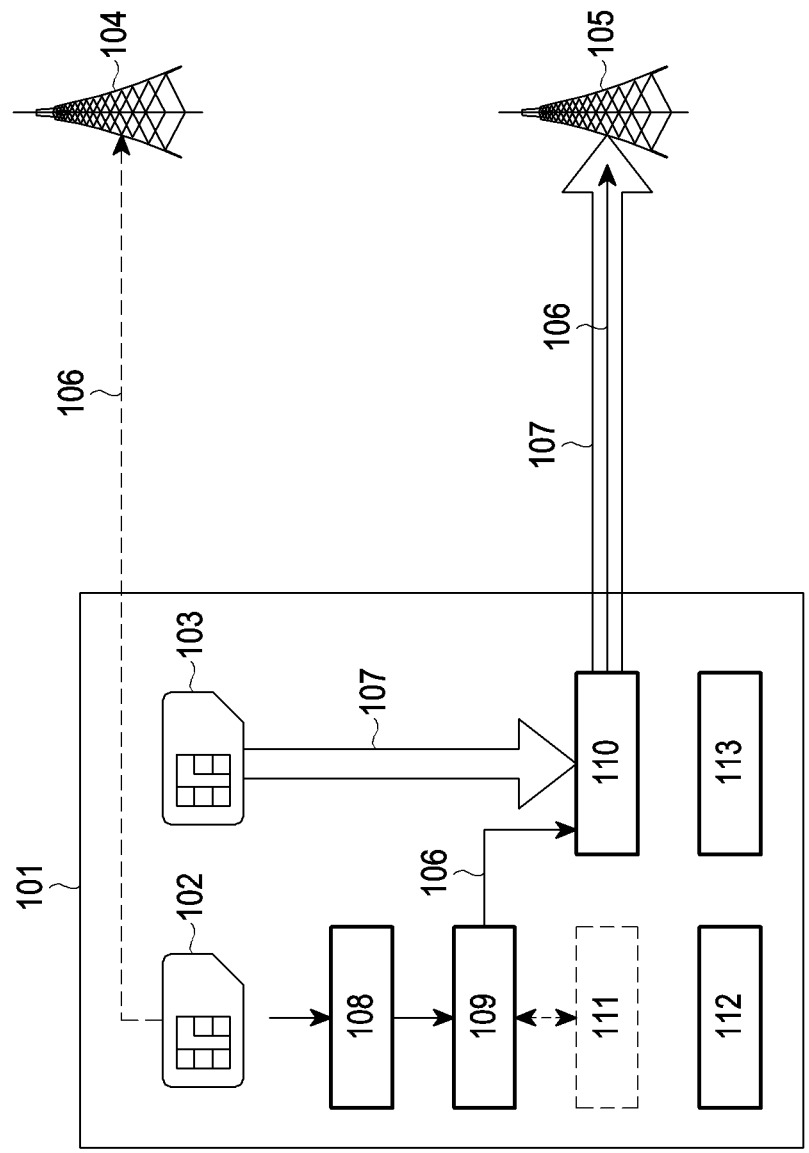
FIG. 1 illustrates an environment for providing a network service to a user equipment (UE) comprising a plurality of subscriber identity modules (SIMs) according to an embodiment of the disclosure.

The following description with reference the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As is traditional in the field, embodiments may be described and illustrated in terms of blocks which carry out a described function or functions. These blocks, which may be referred to herein as managers, units, modules, hardware components or the like, are physically implemented by analog and/or digital circuits, such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports, such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Referring now to the drawings, and more particularly to FIGS. 1 through 6, where similar reference characters denote corresponding features consistently throughout the figures, there are shown preferred embodiments.

FIG. 1 illustrates an environment for providing a network service to a UE comprising a plurality of SIMs according to an embodiment of the disclosure.

Referring to the FIG. 1, a UE 101 may comprise a plurality of SIMs 102 and 103. The UE 101 may obtain a network service 106 associated with a first SIM 102 (e.g., a master SIM) using a packet gateway (PGW-1) 104. The UE 101 may obtain a network service 107 associated with a second SIM 103 (e.g., a slave SIM) using a packet gateway (PGW-2) 105. The network service 106 and/or 107 may comprise at least one of a voice communication, a short message service (SMS) communication, a data communication, such as Internet using one or more applications in the UE 101. Further, the plurality of the SIMs 102 and 103 may include an embedded SIM (e-SIM) with one or more SIM profiles corresponding to the mobile network. In one embodiment of the disclosure, when a non-availability of the network service 106 due to poor network coverage or no network coverage is detected for the first SIM 102, the UE 101 may provide the network service 106 associated with the first SIM 102 using the network service 107 associated with the second SIM 103 via a mobile network interface 110 as shown in FIG. 1. In another embodiment of the disclosure, when a non-availability of the network service 106 due to poor network coverage or no network coverage is detected for the second SIM 103, the UE 101 may provide the network service 107 associated with the second SIM 103 using the network service 106 associated with the first SIM 103 via a mobile network interface (not shown in FIG. 1). In the disclosure, when the first SIM 102 denotes the master SIM, the second SIM 103 may denote the slave SIM and vice versa.

The UE 101 may comprise a memory 112, a processor 113 and an enhanced packet data gateway (ePDG) controller 108 communicatively (or operably) coupled to the processor 113 and the memory 112. The ePDG controller 108 detects an event associated with the first SIM 102 from the plurality of SIMs 102 and 103. The event may comprise at least one of a non-availability (denoted using the dotted lines in FIG. 1) of the network service 106 over the first SIM 102, a condition that a critical data session is on-going for at least one application associated with at least one SIM from the plurality of SIMs 102 and 103 in the UE 101, or a condition that a power saving criterion (or power saving criteria) is met in the UE 101. In a first example, the non-availability of the network service 106 and 107 may denote at least one of a poor network connection with the PGW 104 and 105. In a second example, the critical data session on-going for at least one application may indicate at least one of an incoming call, an outgoing call, a SMS chat session, an online gaming session, a payment transaction session and the like. The at least one application may indicate an SMS application, a phone call application, an e-commerce application, a gaming application, a payment application and the like. In a third example, the power saving criteria in the UE 101 may denote a charge in a battery of the UE 101 less than a pre-defined (or set) threshold.

In an embodiment of the disclosure, when the ePDG controller 108 of the UE 101 may detect the event associated with the first SIM 102, the ePDG controller 108 of the UE 101 may create an enhanced packet data gateway (ePDG) interface 109 for the first SIM 102 using a physical interface (e.g., a mobile network interface 110) associated with a mobile network of the second SIM 103 from the plurality of SIMs 102 and 103. The mobile network of the second SIM 103 may provide the data communication based network service 107 to the UE 101.

In an embodiment of the disclosure, the ePDG controller 108 of the UE 101 may provide the network service 106 associated with the first SIM 102 using the ePDG interface 109. The network service 106 associated with the first SIM 102 is communicated between the UE 101 and the PGW-1 104 using the mobile network interface 110 via the PGW-2 105 as shown in FIG. 1.

In an embodiment of the disclosure, when the event associated with the first SIM is detected, the ePDG controller 108 of the UE 101 may check the availability of a Wi-Fi connection. If the Wi-Fi connection is available, then the ePDG controller 108 of the UE 101 may provide the network service 106 associated with the first SIM 102 using the Wi-Fi connection via the Wi-Fi Interface 111.

In an embodiment of the disclosure, the UE 101 may perform data switching between the mobile network of the first SIM 102 and the mobile network of the second SIM 103 to perform the network service 106 and 107. For example, when the second SIM 103 has a network problem to serve the user because of the network condition or network layer problems, the UE 101 may perform data switching from the second SIM 103 to the first SIM 102 and creates the ePDG interface for second SIM 103 using the mobile network of the first SIM 102.

Figure 2:
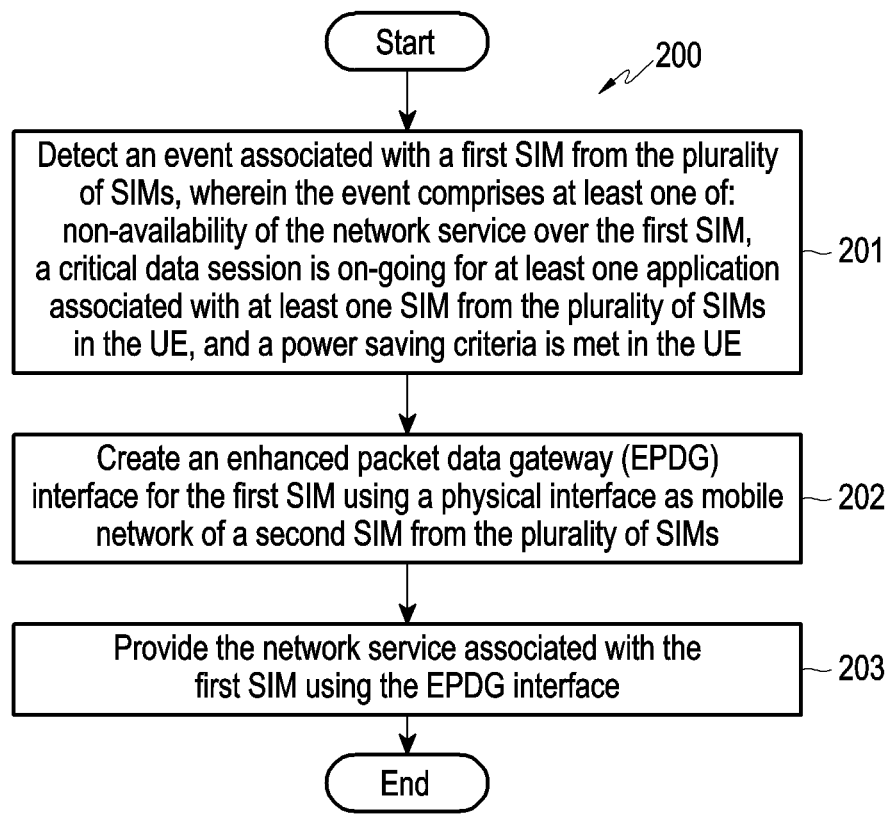
FIG. 2 illustrates a flowchart for a method of providing a network service to a UE according to an embodiment of the disclosure.

FIG. 2 illustrates a flowchart 200 for a method of providing a network service to a UE according to an embodiment of the disclosure.

Referring to the FIG. 2, at operation 201, an ePDG controller 108 of a UE 101 in FIG. 1 may detect (or identify) an event associated with a first SIM 102 from a plurality of SIMs 102 and 103, wherein the event may comprise at least one of: a non-availability of a network service 106 over the first SIM 102, a condition that a critical data session is on-going for at least one application associated with at least one SIM from the plurality of SIMs 102 and 103 in the UE 101, and a condition that a power saving criteria is met in the UE 101.

Figure 3:
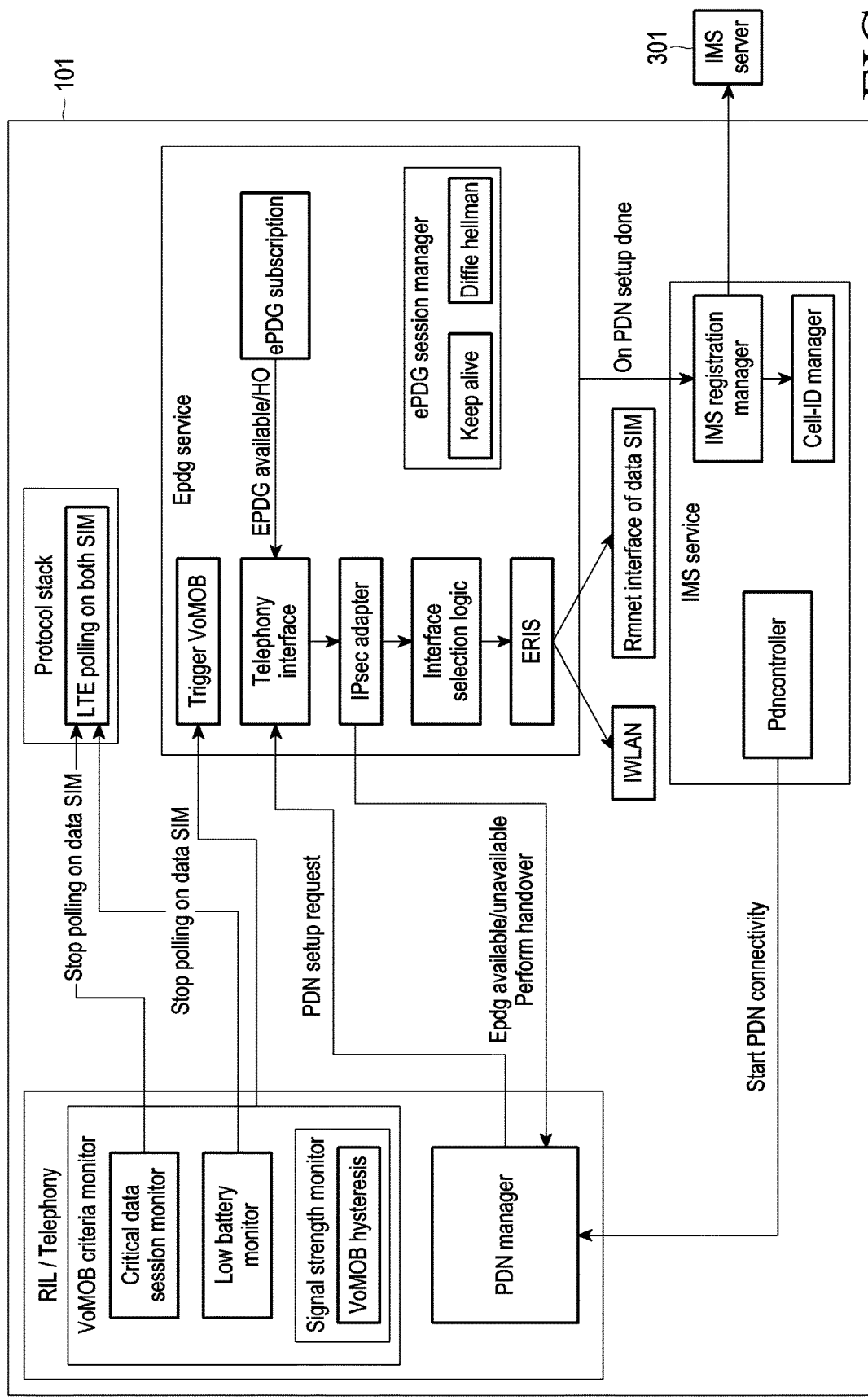
FIG. 3 illustrates a simplified block diagram of a UE with functional blocks required for providing a network service according to an embodiment of the disclosure.

FIG. 3 illustrates a simplified block diagram of a UE with functional blocks required for providing a network service according to an embodiment of the disclosure.

Referring to the FIG. 3, in an embodiment of the disclosure, detecting (or identifying) an event associated with a first SIM 102 from a plurality of SIMs 102 and 103 is performed by a voice over mobile (VoMOB) block in the UE 101 as shown in FIG. 3. In another embodiment of the disclosure, an event associated with a second SIM 103 from the plurality of SIMs 102 and 103 may be detected by the VoMOB block in the UE 101 as shown in FIG. 3. The VoMOB block may be implemented in an ePDG controller 108 in FIG. 1.

Figure 4:
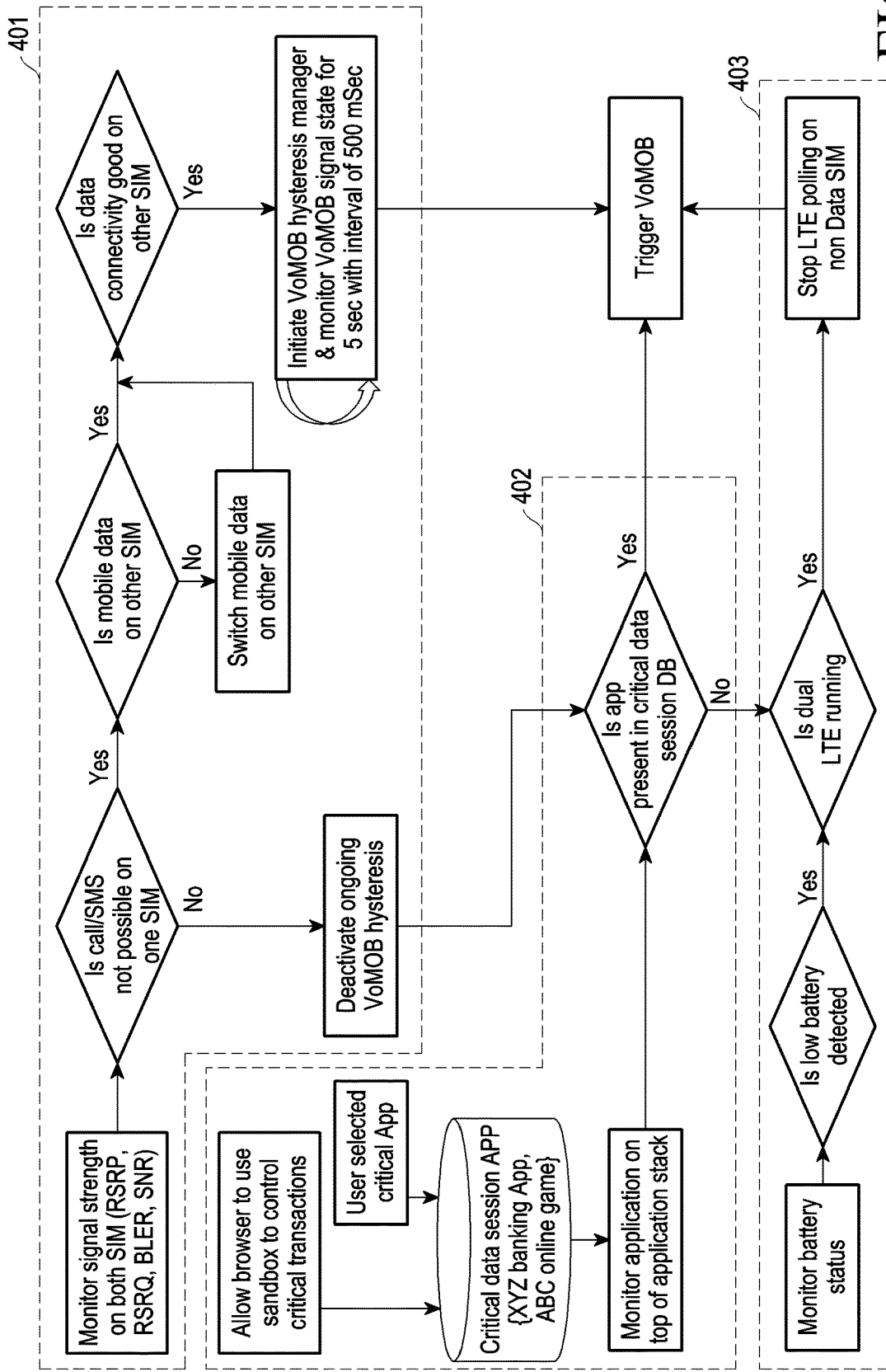
FIG. 4 illustrates a flowchart for detecting an event associated with a first SIM in a UE according to an embodiment of the disclosure.

FIG. 4 illustrates a flowchart for detecting an event associated with a first SIM in a UE according to an embodiment of the disclosure.

Referring to the FIG. 4, in an embodiment of the disclosure, detecting (or identifying), by a UE 101, a non-availability of the network service 106 over a first SIM 102 may comprise obtaining at least one network availability parameter associated with a first SIM 102 as shown in block 401 in FIG. 4. The at least one network availability parameter may comprise at least one of a reference signal received power (RSRP) value, a reference signal received quality (RSRQ) value, a block error rate (BLER) value, a signal to noise ratio (SNR) value, or a real-time transport protocol (RTP) packet loss value based on a received signal associated with the first SIM 102 as shown in block 401 in FIG. 4. In addition, the network availability parameters may include and the network statistics, such as data throughput, transmission control protocol (TCP) error, packet response timeout and the like. The network availability parameter is obtained a signal strength monitor block of the UE 101 as shown in FIG. 3.

In an embodiment of the disclosure, the ePDG controller 108 determines whether the at least one network availability parameter meets a network availability criteria. In an embodiment of the disclosure, the network availability criteria (or criterion) may be dynamically defined (or may be determined) based on at least one of a location of the UE 101, an availability of at least one application in the UE 101, or a signal strength level defined configuration (or a signal strength level configuration). For example, when the location of the UE 101 inside an elevator, inside a house, the signal strength level of the network availability parameters may not meet the network availability criteria. In another example, the signal strength level defined configuration denotes a pre-defined values of the RSRP, the RSRQ, the SNR, the BLER, the RTP required for obtaining the network service 106 from the first SIM 102.

Further, the ePDG controller 108 detects the non-availability of the network service over the first SIM 102 in response to determining (or identifying) that the at least one network availability parameter meets a network availability criteria. For example, if the values of the RSRP, the RSRQ, the BLER, and the SNR for the UE 101 is less than the signal strength level defined configuration, then the network availability parameter does not meet the network availability criteria.

In an embodiment of the disclosure, the critical data session monitor as shown in FIG. 3 may be implemented in the ePDG controller 108. Further, the critical data session monitor block is configured to detect the critical data session is on-going for at least one application associate with the plurality of SIMs 102 and 103 as shown in the block 402 of FIG. 4. The ePDG controller 108 identifies the at least one application having the on-going data session associated with the plurality of SIMs 102 and 103. The at least one application having the on-going data session may be identified based on the open network connections/sessions in the UE 101. Further, the ePDG controller 108 may determine (or identify) whether the at least one application meets a critical application criteria. The critical application criteria may be dynamically defined (or determined) based on at least one of a critical application database, a categorization of an activity as critical by a protocol stack of the UE 101, an preference setting of at least one application in the UE 101. For example, for a payment application in the UE 101, a server associated with the payment application may indicate to the UE 101 that the payment application is critical using a sandbox and the UE 101 may store the payment application in the database. In another example, the user may modify the preference setting of at least one application as critical and the UE 101 may store the at least one application in the database.

Further, the ePDG controller 108 may detect (or identify) that the on-going data session for the at least one application as the critical data session in response to determining that the at least one application meets the critical application criteria as shown in the block 402 of FIG. 4. For example, if the one or more applications stored in the database identified as critical applications has the on-going data session using at least one of the first SIM 102 and the second SIM 103, then the on-going data session from the one or more applications may be detected (or identified) as the critical data session.

In an embodiment of the disclosure, low battery monitor block as shown in FIG. 3 may be implemented in the ePDG controller 108 for detecting the power saving criteria is met in the UE. The ePDG controller 108 detects the power saving criteria is met or not met by determining a current state of the UE 101 as shown in the block 403 of FIG. 4. The current state of the UE 101 may indicate at least one of a current state of charge (SOC) of the battery of the UE 101, a number of applications running in the UE 101, a type of application running in the UE 101, or a location of the UE 101.

In an embodiment of the disclosure, the ePDG controller 108 may determine (or identify) whether the current state of the UE 101 meets the power saving criteria. The power saving criteria may be dynamically defined (or determined) based on at least one of the location of the UE 101, a usage pattern of at least one application of the UE 101, or a usage pattern of the battery of the UE 101. For example, the SOC in the battery is compared with a pre-defined (or set) value. In another example, the rate of decrease in the SOC in the battery may indicate the usage pattern of the battery.

In an embodiment of the disclosure, the ePDG controller 108 may detect whether the power saving criteria is met in the UE 101 in response to determining that the current state of the UE 101 meets the power saving criteria. For example, when the SOC in the battery is less than the pre-defined value say 15%, then the ePDG controller 108 may detect that the power saving criteria is not met in the UE 101. In another example, the power saving mode may be enabled by a user input, or the UE 101 detects a high CPU usage that is draining the battery at a fast rate like heavy graphic gaming application, and the like.

In one embodiment of the disclosure, when the event associated with the first SIM 102 may correspond to the power saving criteria, and mobile data is switched on in both the first SIM 102 and the second SIM 103, the ePDG controller 108 may configure a protocol stack of the UE 101 to stop a radio frequency polling for the first SIM 102 as shown in the block 403 of FIG. 4 and use the mobile data of the second SIM 103 as the physical interface to provide the network service 106 for the first SIM 102.

In one embodiment of the disclosure, the UE 101 may include only a first SIM 102 from the plurality of the SIMS 102 and 103 (e.g., except the first SIM 102, SIM card is not present in other SIM slots the UE 101). Further, the first SIM 102 provides a call and or SMS service via a 4th generation (4G) connection and provides the data services using a 5th generation (5G) connection. The protocol stack in the UE 101 may need to perform a Radio Frequency polling on both the frequencies (e.g., a frequency associated with a 4G connection and a frequency associated with a 5G connection) at fast rate to provide network service 106 using both the 5G connection and the 4G connection. Because of the polling at the fast rate, the charge in the battery of the UE 101 may drain at a faster rate. The UE 101 may detect that the power saving criteria is not met and creates the ePDG interface 109 to provide the call and/or SMS service and the data service using the 5G connection and terminates the 4G connection.

In an embodiment of the disclosure, when the event associated with the first SIM 102 is detected, the ePDG controller triggers the VoMOB service, as detailed in operations 202 and 203.

At operation 202, the ePDG controller 108 of the UE 101 may create the enhanced packet data gateway (ePDG) interface 109 for the first SIM 102 using the physical interface (i.e., a mobile network interface 110) as the mobile network of the second SIM 103 from the plurality of SIMs 103 and 104.

Figure 5:
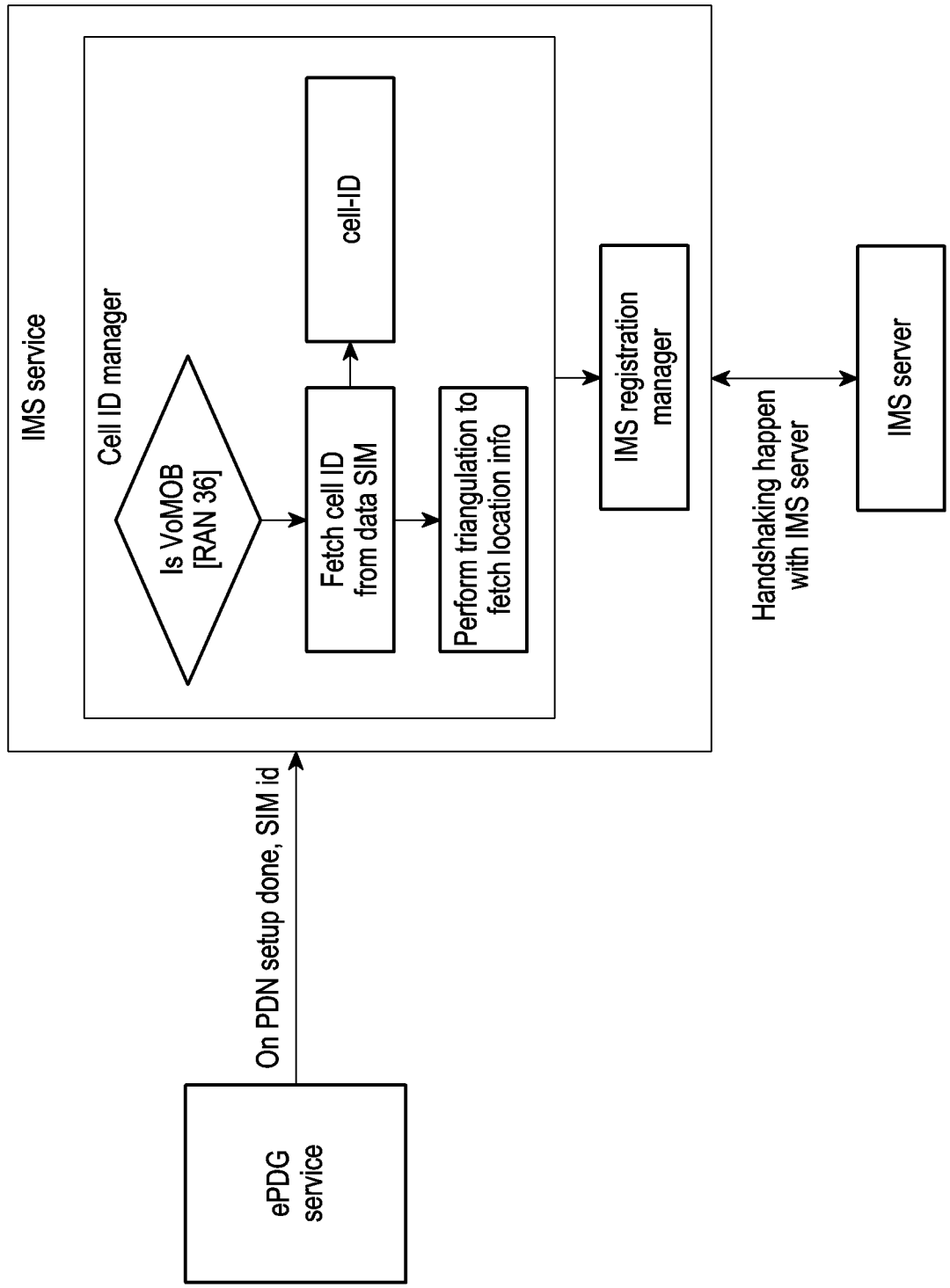
FIG. 5 illustrates a registration and handshake operation between a UE and an Internet protocol multimedia subsystem (IMS) server associated with a first SIM according to an embodiment of the disclosure.

FIG. 5 illustrates a registration and handshake operation between a UE and an IMS server associated with a first SIM according to an embodiment of the disclosure.

Referring to the FIG. 5, in an embodiment of the disclosure, an ePDG service functional block and an IMS service functional block as shown in FIG. 3 is implemented in an ePDG controller 108 for creating an ePDG interface. The ePDG controller 108 may create the ePDG interface for the first SIM 102 using a data network of the second SIM 103 by performing a handshake operation. In one embodiment of the disclosure, the packet data network (PDN) manager sends a (PDN) set-up request for setting up a connection with a IMS server 301 of the first SIM 102 using the mobile network interface 110 of the second SIM 103 as shown in FIG. 5.

In an embodiment of the disclosure, the handshake operation may comprise sending a request to an Internet protocol multimedia subsystem (IMS) server 301 associated with a network provider of the first SIM 102 to process the network service 106 for the first SIM 102 via the mobile network of the second SIM 103 as a single call using a subscriber information present in universal SIM (USIM) or Internet protocol multimedia services identity module (ISIM) application for example, international mobile subscriber identity (IMSI), IP multimedia public identity (IMPU), IP multimedia private identity, shared keys, and a mobile station international subscriber directory number (MSISDN) (e.g., a SIM id), of the first SIM 101. The cell ID manager implemented in the IMS service of the UE 101 may be configured to perform the handshaking operation using the cell-id of the second SIM 103, the subscriber information of the first SIM 102, and/or location information of the UE 101 as shown in FIG. 5.

Further, the handshaking operation may comprise receiving a response from the IMS server 301 indicating an acceptance to process the network service 106 associated with the first SIM 102 via the mobile network of the second SIM 103.

At operation 203, the ePDG controller 108 of the UE 101 provides the network service 106 associated with the first SIM 102 using the ePDG interface 109.

Figure 6:
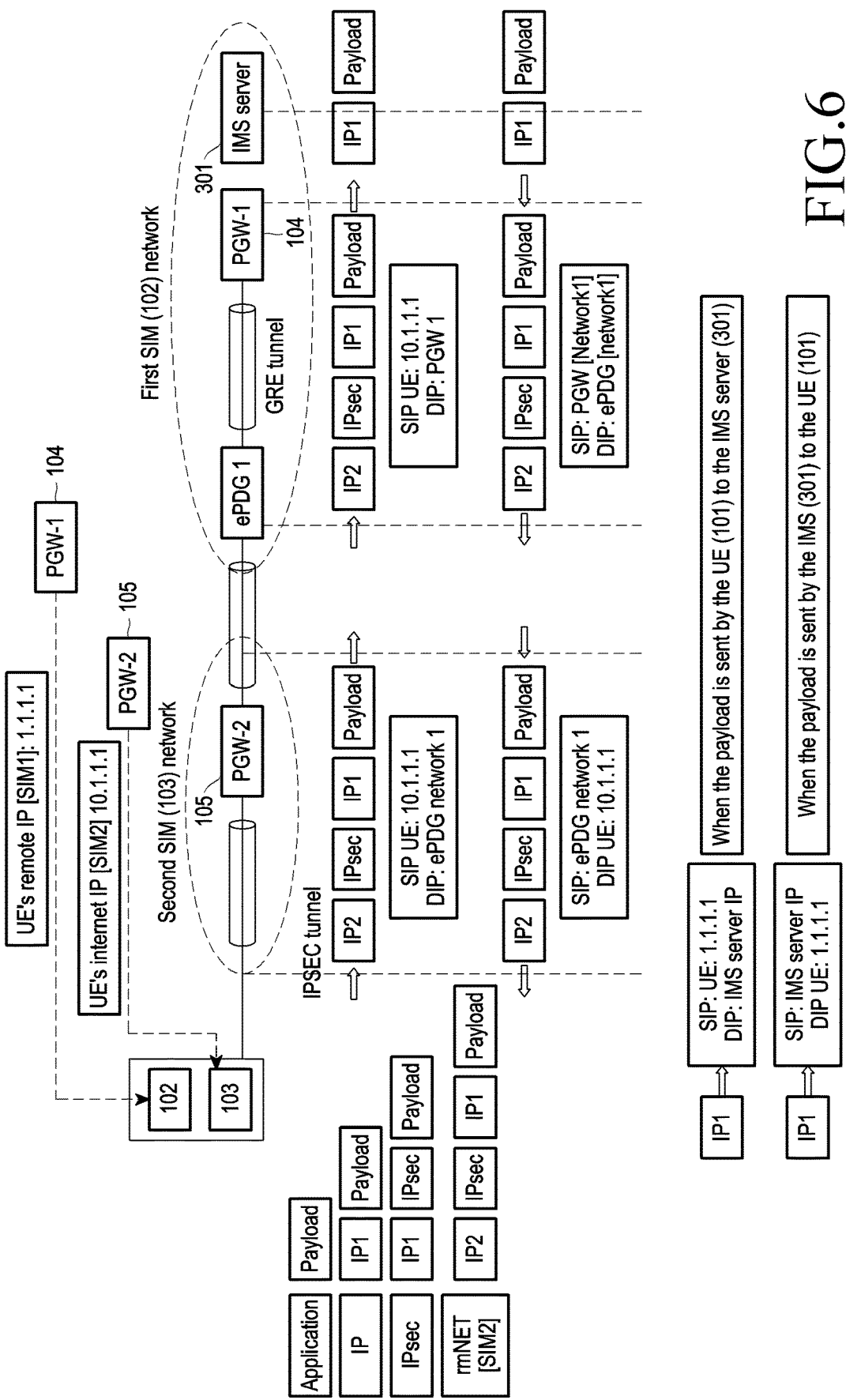
FIG. 6 illustrates an exchange of a network service between a first SIM and an IMS server using an enhanced packet data gateway (ePDG) interface and a mobile network of a second SIM according to an embodiment of the disclosure.

FIG. 6 illustrates an exchange of a network service between a first SIM and an IMS server using an ePDG interface and a mobile network of a second SIM according to an embodiment of the disclosure.

Referring to the FIG. 6, in an embodiment of the disclosure, an ePDG controller 108 may provide a network service 106 associated with a first SIM 102 using an ePDG interface 109 by creating a data packet by encapsulating a payload associated with the network service and an Internet protocol (IP) header associated with the first SIM 102, wherein the encapsulating the data packet may be performed using the IP header associated with the second SIM 103. For example, in the UE 101, a payload of the user and an IP header of the first SIM 102 may be encapsulated using the IP header of the second SIM 103 and sent to IMS server 301 via PWG-2 105, ePDG-1, and PWG-1 104 as shown in FIG. 6. The IP header of the second SIM 103 may be modified based on the destination as shown in FIG. 6.

In an embodiment of the disclosure, the ePDG controller 108 may send the data packet to at least one network component comprising at least one of an IMS server, an extensible markup language (XML) configuration access protocol (XCAP) server, and a multimedia messaging service (MMS) server, associated with the first SIM 102 based on the application communicating in the UE 101.

In an embodiment of the disclosure, the ePDG controller 108 may provide the network service 106 associated with the first SIM 102 to the user using the ePDG interface 109 by receiving the data packet comprising the payload and the IP header associated with the first SIM 102 encapsulated using a IP header associated with the second SIM 103 from the IMS server 301 corresponding to the first SIM 102. For example, in the UE 101, the payload of the user and the IP header of the first SIM 102 may be received from the IMS server 301 via the PWG-1 104, the ePDG-1, and the PWG-2 105, as shown in FIG. 6. The IP header of the second SIM 103 may be modified based on the destination as shown in FIG. 6.

Further, the UE 101 may provide the payload and the IP header associated with the first SIM 102 to the user, wherein the user payload may comprise the network service 106.

Figure 7A:
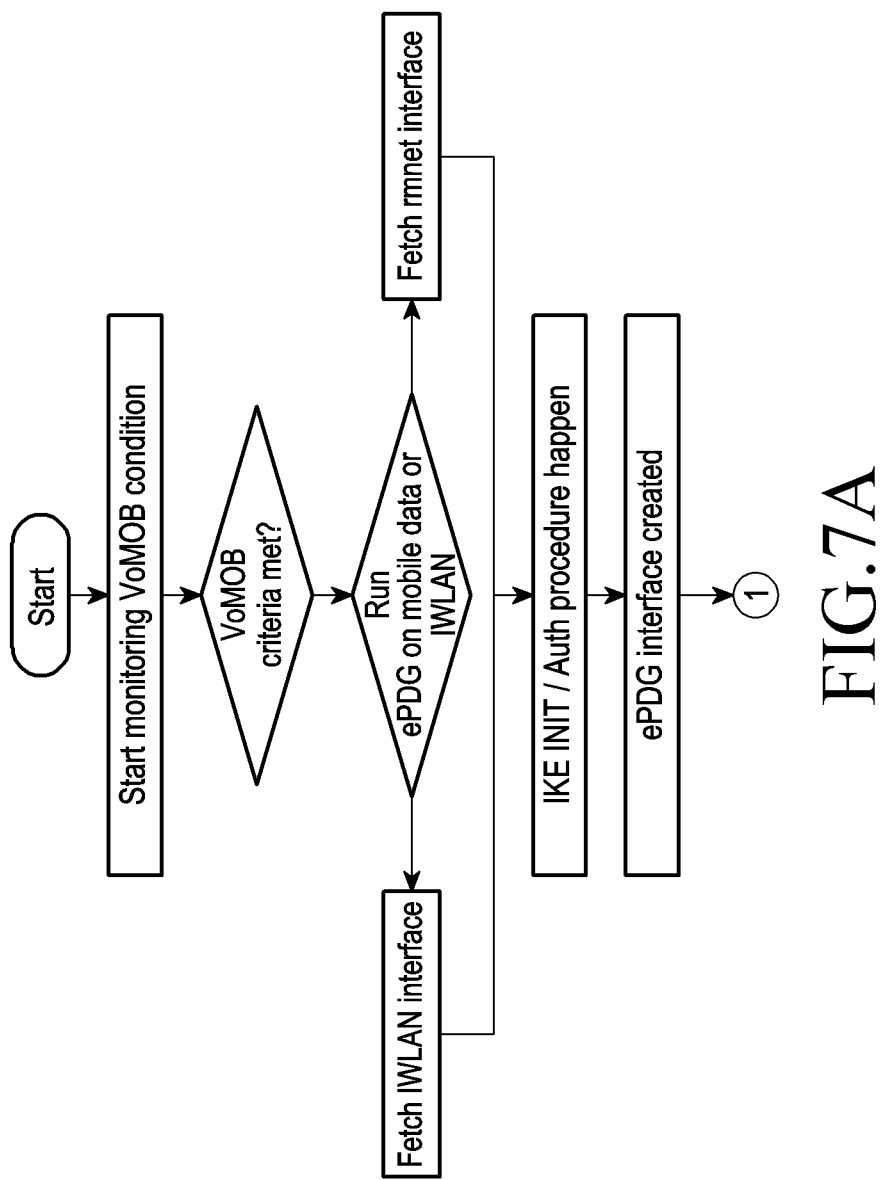
FIGS. 7A and 7B illustrate flowcharts for providing a network service to a first SIM using one of Wi-Fi or mobile network of a second SIM according to various embodiments of the disclosure.
Figure 7B:
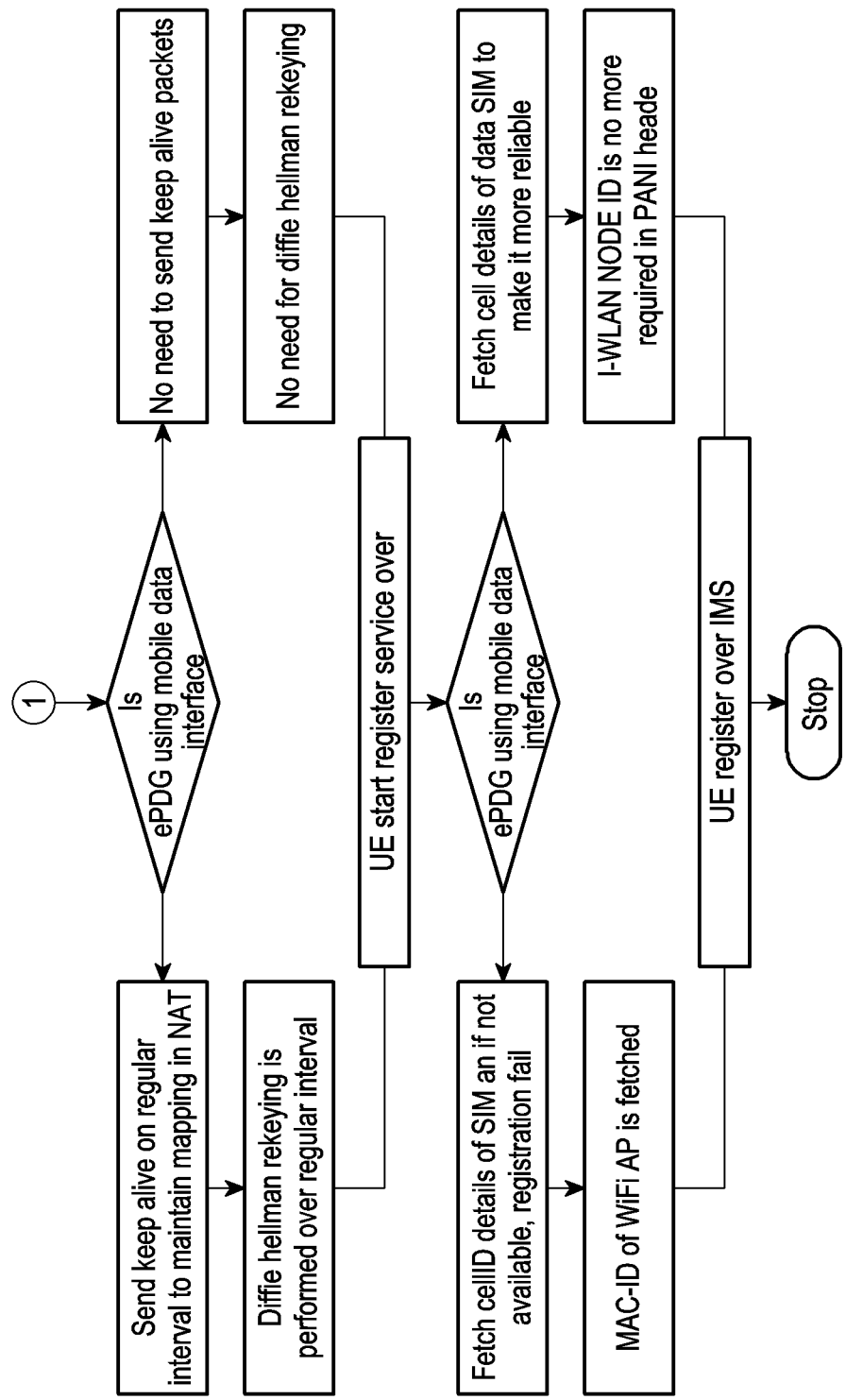

FIGS. 7A and 7B illustrate flowcharts for providing a network service to a first SIM using one of Wi-Fi or mobile network of a second SIM according to various embodiments of the disclosure.

Figure 8:
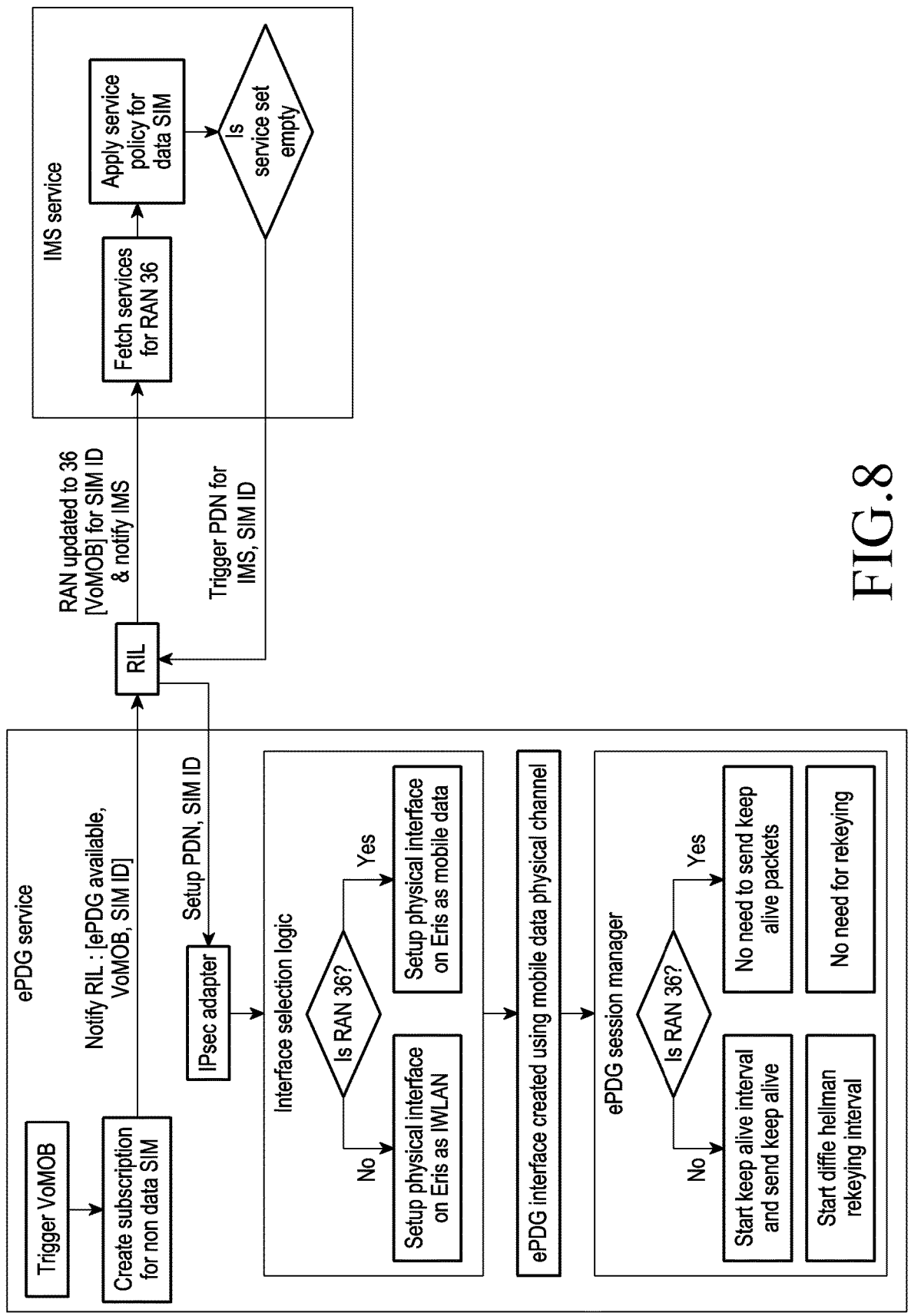
FIG. 8 illustrates one or more functional blocks of a UE used for providing a network service to a first SIM using one of Wi-Fi or mobile network of a second SIM according to an embodiment of the disclosure.

Referring to the FIGS. 7A and 7B, a UE 101 may monitor for the detection of the event associated with the first SIM 102 as shown in FIGS. 7A and 7B. When the event associated with the first SIM 102 is detected, the UE 101 may create the ePDG interface 109 using the Wi-Fi interface 111 when the Wi-Fi is available. Alternatively, the UE 101 may create the ePDG interface 109 using the mobile network interface 110 of the second SIM 103 when the Wi-Fi is not available. The UE 101 may perform authorization using Internet key exchange (IKE) with one of a Wi-Fi interface 111 or the mobile network interface 110 as shown in FIGS. 7A and 7B. The detection of the event is performed by the ePDG service functional block of the UE 101 as shown in FIG. 8. Further, creation of the ePDG interface 109 may be performed by the Interface Selection functional block of the UE 101 as shown in FIG. 8.

Referring to the FIGS. 7A and 7B, in an embodiment of the disclosure, when the ePDG interface 109 may be created using the Wi-Fi interface 111, the UE 101 may periodically send a Keep Alive message at regular intervals and may periodically perform key exchange at regular intervals as this encryption key is decodable by brute force, for encrypting the data packets using Diffie-Hellman key exchange technique as shown in FIGS. 7A and 7B. Without keep alive signal, intermediate NAT-enabled routers may drop the connection after some time of inactivity and sending the Keep Alive messages is mandatory. Alternatively, when the ePDG interface 109 may be created using the mobile network interface 110 of the second SIM 103, Keep Alive messages may not be sent because the connection maintenance is performed by the second SIM 103 and the key exchange is not performed or the frequency of rekeying is less when compared with the Wi-Fi connection because the mobile network has an in-built encryption as shown in FIGS. 7A and 7B. In an embodiment of the disclosure, sending the Keep Alive message and the key exchange is performed by the ePDG Session Manager functional block of the UE (101) as shown in FIG. 8.

FIG. 8 illustrates one or more functional blocks of a UE used for providing a network service to a first SIM using one of Wi-Fi or mobile network of a second SIM according to an embodiment of the disclosure.

Referring to the FIG. 8, in an embodiment of the disclosure, a UE 101 may register with an IMS server 301 via one of a Wi-Fi interface 111 or a mobile network interface 110 by performing the handshaking operation as shown in FIGS. 7A and 7B. The handshaking operation is used to request the IMS server 301 may process a network service 106 for a first SIM 102 via the mobile data of the second SIM 103 or the Wi-Fi network as a single call using a subscriber information present in universal SIM (USIM) or Internet protocol multimedia services identity module (ISIM) for example, international mobile subscriber identity (IMSI), IP multimedia public identity (IMPU), IP multimedia private identity, shared keys, and a mobile station international subscriber directory number (MSISDN) of the first SIM 102. Further, the registration of the UE 101 with the IMS server 301 may be performed by the ePDG service functional block as shown in FIG. 8. The ePDG service creates a tunnel with the IMS server and the IMS Service will perform the registration with IMS server.

After the registration of the UE 101 with the IMS server 301, the network service 106 for the first SIM 102 may be provided via one of the Wi-Fi interface 111 or the mobile network interface 110 of the second SIM 103.

Figure 9:
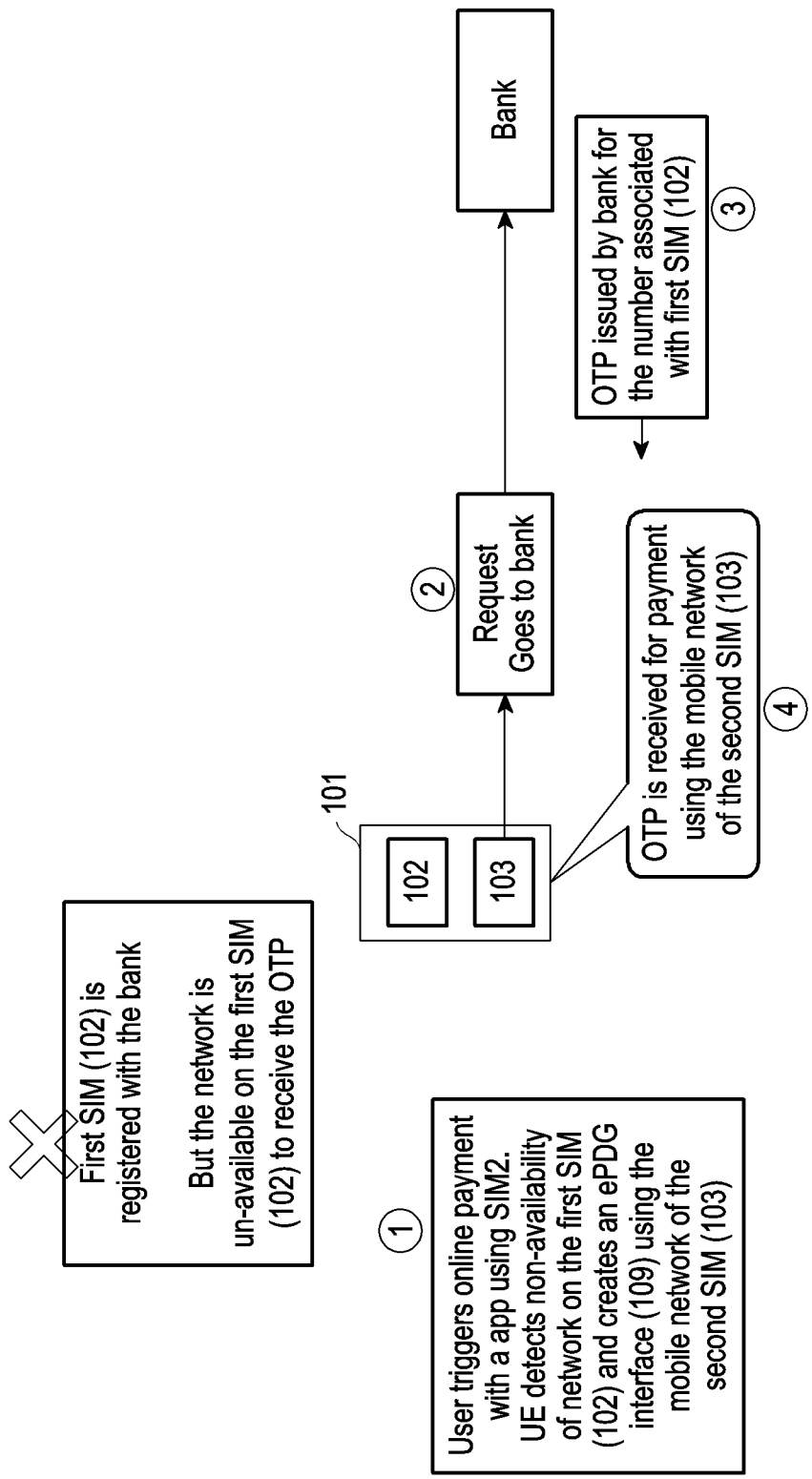
FIG. 9 illustrates a processing of payment transaction by a UE using an ePDG interface according to an embodiment of the disclosure.

FIG. 9 illustrates a processing of payment transaction by a UE using an ePDG interface according to an embodiment of the disclosure.

Referring to the FIG. 9, an online payment may be initiated using an application in a UE 101. For example, a user of the UE 101 may initiate an online payment using the application in the UE 101. The application uses a mobile network of the SIM2 for processing the payment and sends the request to the bank. Further, the phone number associated with the first SIM 102 is registered with the Bank. But the network is un-available on the first SIM 102 to receive the OTP from the Bank. The UE 101 detects non-availability of network on the first SIM 102 and creates an ePDG interface 109 using the mobile network of the Second SIM 103. Further, the bank sends the OTP to the UE via the IMS server 301 associated with the first SIM 102. Since the ePDG interface is created between the UE 101 and the IMS server 301 associated with the first SIM 102, the OTP is received by the UE 101 via the mobile network of the second SIM 103 and the payment is completed successfully.

The embodiments disclosed herein, provides an un-interrupted network service 106 for the first SIM 102 during the non-availability of the network service 106 via the mobile network of the second SIM 103. Further, the embodiments disclosed herein reduces the power consumption in the UE 101.

The embodiments disclosed herein can be implemented using at least one software program running on at least one hardware device and performing network management functions to control the elements.

Figure 10:
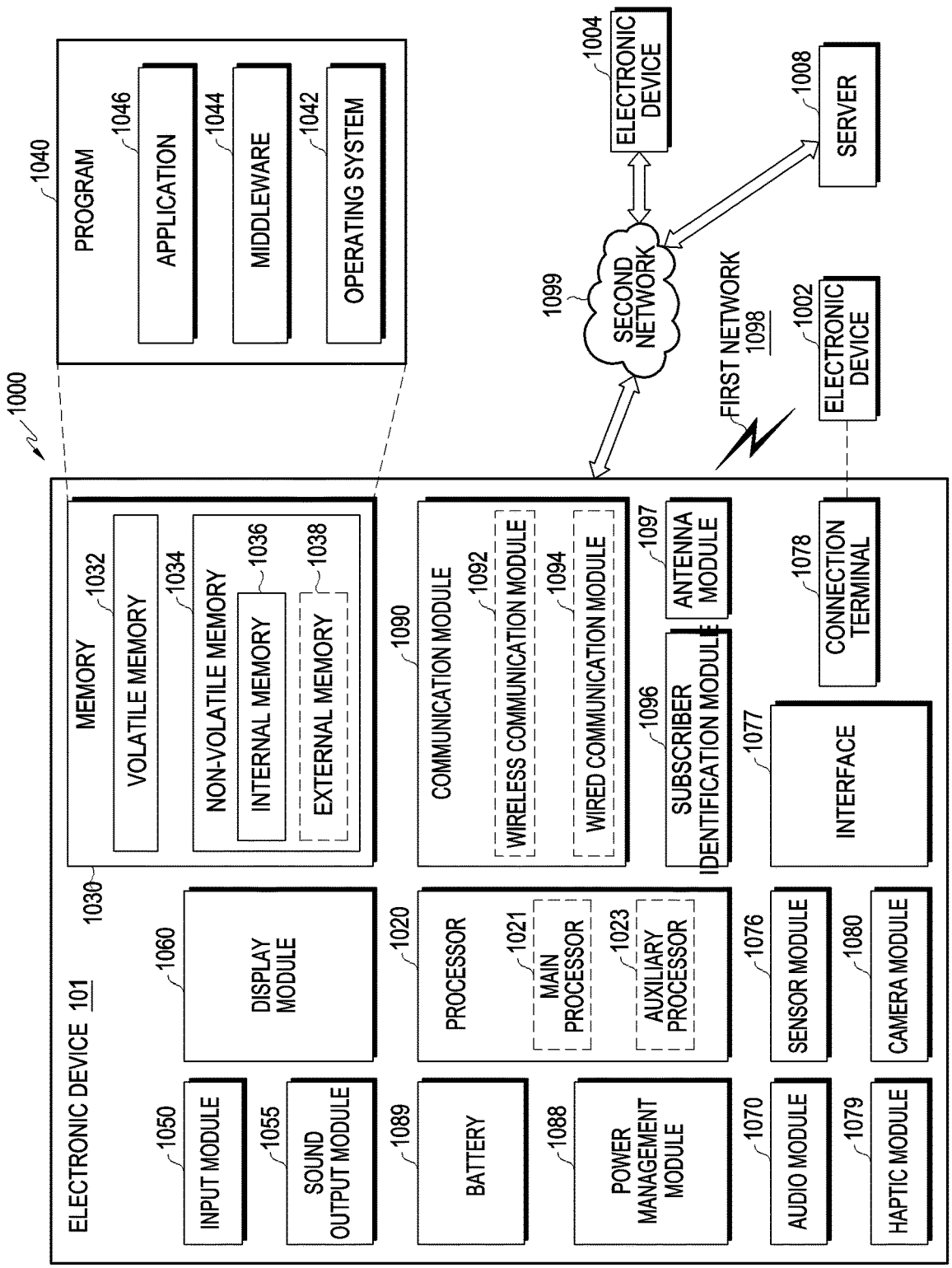
FIG. 10 is a block diagram illustrating an electronic device in a network environment according to an embodiment of the disclosure.

FIG. 10 is a block diagram illustrating an electronic device 101 in a network environment 1000 according to an embodiment of the disclosure.

Referring to FIG. 10, an electronic device (or a UE) 101 in a network environment 1000 may communicate with an electronic device 1002 via a first network 1098 (e.g., a short-range wireless communication network), or an electronic device 1004 or a server 1008 via a second network 1099 (e.g., a long-range wireless communication network). According to an embodiment, the electronic device 101 may communicate with the electronic device 1004 via the server 1008. According to an embodiment, the electronic device 101 may include a processor 1020, a memory 1030, an input module 1050, a sound output module 1055, a display module 1060, an audio module 1070, a sensor module 1076, an interface 1077, a connecting terminal 1078, a haptic module 1079, a camera module 1080, a power management module 1088, a battery 1089, a communication module 1090, a subscriber identification module (SIM) 1096, or an antenna module 1097. According to an embodiment, the processor 1020 may be implemented with a form in which a processor 113 and an ePDG controller 108 in FIG. 1 are combined. According to an embodiment, the processor 1020 may be implemented a form similar to or same as the ePDG controller 108 in FIG. 1. In some embodiments, at least one of the components (e.g., the connecting terminal 1078) may be omitted from the electronic device 101, or one or more other components may be added in the electronic device 101. In some embodiments, some of the components (e.g., the sensor module 1076, the camera module 1080, or the antenna module 1097) may be implemented as a single component (e.g., the display module 1060).

The processor 1020 may execute, for example, software (e.g., a program 1040) to control at least one other component (e.g., a hardware or software component) of the electronic device 101 coupled with the processor 1020, and may perform various data processing or computation. According to one embodiment, as at least part of the data processing or computation, the processor 1020 may store a command or data received from another component (e.g., the sensor module 1076 or the communication module 1090) in volatile memory 1032, process the command or the data stored in the volatile memory 1032, and store resulting data in non-volatile memory 1034. According to an embodiment, the processor 1020 may include a main processor 1021 (e.g., a central processing unit (CPU) or an application processor (AP)), or an auxiliary processor 1023 (e.g., a graphics processing unit (GPU), a neural processing unit (NPU), an image signal processor (ISP), a sensor hub processor, or a communication processor (CP)) that is operable independently from, or in conjunction with, the main processor 1021. For example, when the electronic device 101 includes the main processor 1021 and the auxiliary processor 1023, the auxiliary processor 1023 may be adapted to consume less power than the main processor 1021, or to be specific to a specified function. The auxiliary processor 1023 may be implemented as separate from, or as part of the main processor 1021.

The auxiliary processor 1023 may control, for example, at least some of functions or states related to at least one component (e.g., the display module 1060, the sensor module 1076, or the communication module 1090) among the components of the electronic device 101, instead of the main processor 1021 while the main processor 1021 is in an inactive (e.g., sleep) state, or together with the main processor 1021 while the main processor 1021 is in an active (e.g., executing an application) state. According to an embodiment, the auxiliary processor 1023 (e.g., an image signal processor or a communication processor) may be implemented as part of another component (e.g., the camera module 1080 or the communication module 1090) functionally related to the auxiliary processor 1023. According to an embodiment, the auxiliary processor 1023 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 1008). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1030 may store various data used by at least one component (e.g., the processor 1020 or the sensor module 1076) of the electronic device 101. The various data may include, for example, software (e.g., the program 1040) and input data or output data for a command related thereto. The memory 1030 may include the volatile memory 1032 or the non-volatile memory 1034.

The program 1040 may be stored in the memory 1030 as software, and may include, for example, an operating system (OS) 1042, middleware 1044, or an application 1046.

The input module 1050 may receive a command or data to be used by another component (e.g., the processor 1020) of the electronic device 101, from the outside (e.g., a user) of the electronic device 101. The input module 1050 may include, for example, a microphone, a mouse, a keyboard, a key (e.g., a button), or a digital pen (e.g., a stylus pen).

The sound output module 1055 may output sound signals to the outside of the electronic device 101. The sound output module 1055 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1060 may visually provide information to the outside (e.g., a user) of the electronic device 101. The display module 1060 may include, for example, a display, a hologram device, or a projector and control circuitry to control a corresponding one of the display, hologram device, and projector. According to an embodiment, the display module 1060 may include a touch sensor adapted to detect a touch, or a pressure sensor adapted to measure the intensity of force incurred by the touch.

The audio module 1070 may convert a sound into an electrical signal and vice versa. According to an embodiment, the audio module 1070 may obtain the sound via the input module 1050, or output the sound via the sound output module 1055 or an external electronic device (e.g., an electronic device 1002 (e.g., a speaker or a headphone)) directly or wirelessly coupled with the electronic device 101.

The sensor module 1076 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 101 to be coupled with the external electronic device (e.g., the electronic device 1002) directly or wirelessly. According to an embodiment, the interface 1077 may include, for example, a high definition multimedia interface (HDMI), a universal serial bus (USB) interface, a secure digital (SD) card interface, or an audio interface.

A connecting terminal 1078 may include a connector via which the electronic device 101 may be physically connected with the external electronic device (e.g., the electronic device 1002). According to an embodiment, the connecting terminal 1078 may include, for example, a HDMI connector, a USB connector, a SD card connector, or an audio connector (e.g., a headphone connector).

The haptic module 1079 may convert an electrical signal into a mechanical stimulus (e.g., a vibration or a movement) or electrical stimulus which may be recognized by a user via his tactile sensation or kinesthetic sensation. According to an embodiment, the haptic module 1079 may include, for example, a motor, a piezoelectric element, or an electric stimulator.

The camera module 1080 may capture a still image or moving images. According to an embodiment, the camera module 1080 may include one or more lenses, image sensors, image signal processors, or flashes.

The power management module 1088 may manage power supplied to the electronic device 101. According to one embodiment, the power management module 1088 may be implemented as at least part of, for example, a power management integrated circuit (PMIC).

The battery 1089 may supply power to at least one component of the electronic device 101. According to an embodiment, the battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 101 and the external electronic device (e.g., the electronic device 1002, the electronic device 1004, or the server 1008) and performing communication via the established communication channel. The communication module 1090 may include one or more communication processors that are operable independently from the processor 1020 (e.g., the application processor (AP)) and supports a direct (e.g., wired) communication or a wireless communication. According to an embodiment, the communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device 1004 via the first network 1098 (e.g., a short-range communication network, such as Bluetooth™, wireless-fidelity (Wi-Fi) direct, or infrared data association (IrDA)) or the second network 1099 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1092 may identify or authenticate the electronic device 101 in a communication network, such as the first network 1098 or the second network 1099, using subscriber information (e.g., international mobile subscriber identity (IMSI)) stored in the subscriber identification module 1096.

The wireless communication module 1092 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1092 may support a high-frequency band (e.g., the mmWave band) to achieve, e.g., a high data transmission rate. The wireless communication module 1092 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1092 may support various requirements specified in the electronic device 101, an external electronic device (e.g., the electronic device 1004), or a network system (e.g., the second network 1099). According to an embodiment, the wireless communication module 1092 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1097 may transmit or receive a signal or power to or from the outside (e.g., the external electronic device) of the electronic device 101. According to an embodiment, the antenna module 1097 may include an antenna including a radiating element composed of a conductive material or a conductive pattern formed in or on a substrate (e.g., a printed circuit board (PCB)). According to an embodiment, the antenna module 1097 may include a plurality of antennas (e.g., array antennas). In such a case, at least one antenna appropriate for a communication scheme used in the communication network, such as the first network 1098 or the second network 1099, may be selected, for example, by the communication module 1090 from the plurality of antennas. The signal or the power may then be transmitted or received between the communication module 1090 and the external electronic device via the selected at least one antenna. According to an embodiment, another component (e.g., a radio frequency integrated circuit (RFIC)) other than the radiating element may be additionally formed as part of the antenna module 1097.

According to various embodiments, the antenna module 1097 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 1004 via the server 1008 coupled with the second network 1099. Each of the electronic devices 1002 or 1004 may be a device of a same type as, or a different type, from the electronic device 101. According to an embodiment, all or some of operations to be executed at the electronic device 101 may be executed at one or more of the external electronic devices 1002, 1004, or 1008. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 1004 may include an internet-of-things (IoT) device. The server 1008 may be an intelligent server using machine learning and/or a neural network. According to an embodiment, the external electronic device 1004 or the server 1008 may be included in the second network 1099. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or two or more functions.

For example, according to an embodiment, the module may be implemented in a form of an application-specific integrated circuit (ASIC).

Various embodiments as set forth herein may be implemented as software (e.g., the program 1040) including one or more instructions that are stored in a storage medium (e.g., internal memory 1036 or external memory 1038) that is readable by a machine (e.g., the electronic device 101). For example, a processor (e.g., the processor 1020) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE), the method comprising:
   identifying an event associated with a first subscriber identity module (SIM) that is registered with a first network from a plurality of SIMs, wherein the event comprises at least one of:
   a non-availability of a network service over the first SIM,
   a condition that a critical data session is on-going for at least one application associated with at least one SIM from the plurality of SIMs, or
   a condition that a power saving criterion is met;
   in response to the identifying of the event associated with the first SIM that is registered with the first network, creating, an enhanced packet data gateway (ePDG) interface for the first SIM, wherein the ePDG interface is configured to provide communication to the first SIM through a physical interface for a mobile network with which a second SIM from the plurality of SIMs is registered; and
   providing, using the ePDG interface, the network service associated with the first SIM through the physical interface for the mobile network with which the second SIM is registered.

2. The method of claim 1, wherein identifying the event associated with the first SIM comprises:
   obtaining at least one network availability parameter associated with the first SIM, wherein the at least one network availability parameter comprises at least one of a reference signal received power (RSRP) value, a reference signal received quality (RSRQ) value, a block error rate (BLER) value, a signal to noise ratio (SNR) value, or a real-time transport protocol (RTP) packet loss value based on a received signal associated with the first SIM;
   identifying whether the at least one network availability parameter meets a network availability criterion; and
   identifying the non-availability of the network service over the first SIM in response to identifying that the at least one network availability parameter meets the network availability criterion.

3. The method of claim 2, wherein the network availability criterion is determined based on at least one of a location of the UE, an availability of at least one application, or a signal strength level configuration.

4. The method of claim 1, wherein identifying the event associated with the first SIM comprises:
   identifying the at least one application having an on-going data session associated with the first SIM or the second SIM;
   identifying whether the at least one application meets a critical application criterion; and
   identifying that the on-going data session for the at least one application as the critical data session in response to identifying that the at least one application meets the critical application criterion.

5. The method of claim 4, wherein the critical application criterion is determined based on at least one of a critical application database, a categorization of an activity as critical by a protocol stack of the UE, or a preference setting of at least one application.

6. The method of claim 1, wherein identifying the event associated with the first SIM comprises:
   identifying a current state of the UE, wherein the current state of the UE indicates at least one of a current state of charge (SOC) of a battery of the UE, a number of applications running in the UE, a type of application running in the UE, or a location of the UE;

identifying whether the current state of the UE meets the power saving criterion; and identifying the power saving criterion is met in response to identifying that the current state of the UE meets the power saving criterion.

7. The method of claim 6, wherein the power saving criterion is determined based on at least one of a location of the UE, a usage pattern of at least one application of the UE, or a usage pattern of the battery of the UE.

8. The method of claim 1, wherein creating the ePDG interface for the first SIM using the network service of the second SIM comprises:
performing a handshake operation by:
sending a request to an Internet protocol multimedia subsystem (IMS) server associated with a network provider of the first SIM to process the network service for the first SIM via mobile data of the second SIM as a single call using subscriber information present in universal SIM (USIM) or Internet protocol multimedia services identity module (ISIM) of the first SIM, and
receiving a response from the IMS server to process the network service associated with the first SIM via the mobile data of the second SIM.

9. The method of claim 1, wherein providing the network service associated with the first SIM using the ePDG interface comprises:
creating a data packet by encapsulating a payload associated with the network service and an Internet protocol (IP) header associated with the first SIM, wherein encapsulating the data packet is performed using an IP header associated with the first SIM; and
sending the data packet to at least one network component comprising at least one of an IMS server, an extensible markup language (XML) configuration access protocol (XCAP) server, or a multimedia messaging service (MMS) server, associated with the first SIM.

10. The method of claim 1, wherein providing the network service associated with the first SIM to a user using the ePDG interface comprises:
receiving a data packet comprising a payload and an Internet protocol (IP) header associated with the first SIM encapsulated using an IP header associated with the second SIM from an IMS server corresponding to the first SIM; and
providing the payload and the IP header associated with the first SIM to the user, wherein the payload comprises the network service.

11. The method of claim 1, further comprising:
configuring a protocol stack of the UE to stop a radio frequency polling for the first SIM and use mobile data of the second SIM as the physical interface to provide the network service for the first SIM.

12. A user equipment (UE) comprising:
a communication circuit;
memory storing one or more computer programs; and
at least one processor operatively coupled to the communication circuit, and the memory,
wherein one or more computer programs include computer-executable instructions that, when executed by the at least one processor individually or collectively, cause the UE to:
identify an event associated with a first subscriber identity module (SIM) that is registered with a first network from a plurality of SIMs, wherein the event comprises at least one of:
a non-availability of a network service over the first SIM,
a condition that a critical data session is on-going for at least one application associated with at least one SIM from the plurality of SIMs, or
a condition that a power saving criterion is met,
in response to the identification of the event associated with the first SIM that is registered with the first network, create an enhanced packet data gateway (ePDG) interface for the first SIM, wherein the ePDG interface is configured to provide communication to the first SIM through a physical interface for a mobile network with which a second SIM from the plurality of SIMs is registered, and
provide, using the ePDG interface, the network service associated with the first SIM using the ePDG interface through the physical interface for the mobile network with which the second SIM is registered.

13. The UE of claim 12, wherein the one or more computer programs further include computer-executable instructions that, when executed by the at least one processor individually or collectively, cause the UE to:
obtain at least one network availability parameter associated with the first SIM, wherein the at least one network availability parameter comprises at least one of a reference signal received power (RSRP) value, a reference signal received quality (RSRQ) value, a block error rate (BLER) value, a signal to noise ratio (SNR) value, or a real-time transport protocol (RTP) packet loss value based on a received signal associated with the first SIM,
identify whether the at least one network availability parameter meets a network availability criterion, and
identify the non-availability of the network service over the first SIM in response to identifying that the at least one network availability parameter meets the network availability criterion.

14. The UE of claim 12, wherein the one or more computer programs further include computer-executable instructions that, when executed by the at least one processor individually or collectively, cause the UE to:
identify the at least one application having an on-going data session associated with the first SIM or the second SIM,
identify whether the at least one application meets a critical application criterion, and
identify that the on-going data session for the at least one application as the critical data session in response to identifying that the at least one application meets the critical application criterion.

15. The UE of claim 12, wherein the one or more computer programs further include computer-executable instructions that, when executed by the at least one processor individually or collectively, cause the UE to:
identify a current state of the UE, wherein the current state of the UE indicates at least one of a current state of charge (SOC) of a battery of the UE, a number of applications running in the UE, a type of application running in the UE, or a location of the UE,
identify whether the current state of the UE meets the power saving criterion, and
identify the power saving criterion is met in response to identifying that the current state of the UE meets the power saving criterion.

16. The UE of claim 15, wherein the power saving criterion is determined based on at least one of a location of the UE, a usage pattern of at least one application of the UE, or a usage pattern of the battery of the UE.

17. The UE of claim 12, wherein the one or more computer programs further include computer-executable instructions that, when executed by the at least one processor individually or collectively, cause the UE to:
perform a handshake operation by:
sending a request to an Internet protocol multimedia subsystem (IMS) server associated with a network provider of the first SIM to process the network service for the first SIM via mobile data of the second SIM as a single call using subscriber information present in universal SIM (USIM) or Internet protocol multimedia services identity module (ISIM) of the first SIM, and
receiving a response from the IMS server to process the network service associated with the first SIM via the mobile data of the second SIM.

18. The UE of claim 12, wherein the one or more computer programs further include computer-executable instructions that, when executed by the at least one processor individually or collectively, cause the UE to:
create a data packet by encapsulating a payload associated with the network service and an Internet protocol (IP) header associated with the first SIM, wherein encapsulating the data packet is performed using the IP header associated with the first SIM, and
send the data packet to at least one network component comprising at least one of an IMS server, an extensible markup language (XML) configuration access protocol (XCAP) server, or a multimedia messaging service (MMS) server, associated with the first SIM.

19. The UE of claim 12, wherein the one or more computer programs further include computer-executable instructions that, when executed by the at least one processor individually or collectively, cause the UE to:
receive a data packet comprising a payload and an Internet protocol (IP) header associated with the first SIM encapsulated using an IP header associated with the second SIM from an IMS server corresponding to the first SIM, and
provide the payload and the IP header associated with the first SIM to a user, wherein the payload comprises the network service.

20. The UE of claim 12, wherein the one or more computer programs further include computer-executable instructions that, when executed by the at least one processor individually or collectively, cause the UE to configure a protocol stack of the UE to stop a radio frequency polling for the first SIM and use mobile data of the second SIM as the physical interface to provide the network service for the first SIM.

* * * * *